(12) United States Patent
Mcgraw

(10) Patent No.: US 9,208,047 B2
(45) Date of Patent: Dec. 8, 2015

(54) DEVICE HARDWARE AGENT

(75) Inventor: Montgomery C. Mcgraw, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 298 days.

(21) Appl. No.: 13/817,932

(22) PCT Filed: Oct. 16, 2010

(86) PCT No.: PCT/US2010/052976
§ 371 (c)(1),
(2), (4) Date: Feb. 20, 2013

(87) PCT Pub. No.: WO2012/050590
PCT Pub. Date: Apr. 19, 2012

(65) Prior Publication Data
US 2013/0151841 A1 Jun. 13, 2013

(51) Int. Cl.
*G06F 9/445* (2006.01)
*G06F 11/30* (2006.01)
*G06F 9/30* (2006.01)
*H04L 12/24* (2006.01)

(52) U.S. Cl.
CPC ............ *G06F 11/3006* (2013.01); *G06F 8/665* (2013.01); *G06F 11/3024* (2013.01); *G06F 11/3041* (2013.01); *G06F 11/3065* (2013.01); *G06F 11/3096* (2013.01); *H04L 41/082* (2013.01); *H04L 41/085* (2013.01); *H04L 41/046* (2013.01)

(58) Field of Classification Search
CPC ............ G05F 11/3006; G05F 11/3024; G05F 11/3041; G05F 11/3065; G05F 11/3096; G06F 8/665; H04L 41/046; H04L 41/083; H04L 41/085
USPC .......... 713/100; 709/202, 212, 221, 224, 249, 709/253
See application file for complete search history.

(56) References Cited

U.S. PATENT DOCUMENTS

| | | | |
|---|---|---|---|
| 5,864,580 A | 1/1999 | Lowe | |
| 6,269,392 B1 | 7/2001 | Cotichini et al. | |
| 7,197,626 B2 | 3/2007 | Jaffrey | |
| 7,398,380 B1 * | 7/2008 | Lovett et al. ...................... | 713/1 |

(Continued)

FOREIGN PATENT DOCUMENTS

| | | |
|---|---|---|
| CN | 1770113 | 5/2006 |
| JP | 10-190519 | 7/1998 |

(Continued)

OTHER PUBLICATIONS

Zhuo et al; "Remote Management with the Baseboard Management Controller in Eight-Generation Dell PowerEdge Servers," Power Solutions, Oct. 2004, pp. 26-29.*

(Continued)

*Primary Examiner* — Alina N Boutah
(74) *Attorney, Agent, or Firm* — Law Office of Philip Scott Lyren

(57) ABSTRACT

A server includes an electronic component, manager baseboard management controller (BMC), and a device hardware agent. The device hardware agent monitors operation of the electronic component and provides updates to the electronic component without utilizing a software agent.

19 Claims, 5 Drawing Sheets

(56) References Cited

U.S. PATENT DOCUMENTS

| | | | |
|---|---|---|---|
| 7,668,941 B1* | 2/2010 | Kathandapani | 709/220 |
| 7,673,290 B1 | 3/2010 | Kothandapani et al. | |
| 7,716,315 B2 | 5/2010 | Sullivan et al. | |
| 8,713,295 B2* | 4/2014 | Bax et al. | 713/1 |
| 8,838,856 B2* | 9/2014 | Partani et al. | 710/62 |
| 2003/0237008 A1* | 12/2003 | Freevol et al. | 713/300 |
| 2004/0228063 A1* | 11/2004 | Hawkins et al. | 361/115 |
| 2005/0229173 A1* | 10/2005 | Mihm et al. | 717/171 |
| 2006/0136703 A1* | 6/2006 | Wisecup et al. | 713/2 |
| 2006/0156398 A1 | 7/2006 | Ross et al. | |
| 2006/0212694 A1* | 9/2006 | Koizumi | 713/2 |
| 2007/0088816 A1* | 4/2007 | Hrustemovic et al. | 709/224 |
| 2007/0094426 A1 | 4/2007 | Chiang et al. | |
| 2007/0169088 A1* | 7/2007 | Lambert et al. | 717/168 |
| 2007/0233833 A1* | 10/2007 | Wang | 709/223 |
| 2008/0005377 A1* | 1/2008 | Lambert et al. | 710/15 |
| 2008/0005446 A1* | 1/2008 | Frantz et al. | 710/313 |
| 2008/0052702 A1* | 2/2008 | Chuang | 717/170 |
| 2008/0060068 A1* | 3/2008 | Mabayoje et al. | 726/9 |
| 2008/0126852 A1* | 5/2008 | Brandyberry et al. | 714/8 |
| 2008/0162981 A1 | 7/2008 | Jajoo et al. | |
| 2008/0201603 A1 | 8/2008 | Ritz et al. | |
| 2008/0243989 A1 | 10/2008 | Barkai et al. | |
| 2008/0313319 A1* | 12/2008 | Geffin | 709/223 |
| 2009/0006834 A1* | 1/2009 | Rothman et al. | 713/2 |
| 2009/0024724 A1* | 1/2009 | Hirai | 709/223 |
| 2009/0077412 A1* | 3/2009 | Langford et al. | 714/4 |
| 2009/0113198 A1* | 4/2009 | Liu et al. | 713/2 |
| 2009/0158048 A1* | 6/2009 | Kim et al. | 713/184 |
| 2009/0164852 A1* | 6/2009 | Purrington et al. | 714/48 |
| 2009/0182799 A1 | 7/2009 | Huang | |
| 2009/0240985 A1* | 9/2009 | Baranowsky | 714/31 |
| 2009/0282283 A1* | 11/2009 | Sakakura et al. | 714/4 |
| 2009/0300332 A1* | 12/2009 | Montgomery et al. | 712/220 |
| 2010/0172050 A1* | 7/2010 | Perusse et al. | 360/71 |
| 2010/0228960 A1* | 9/2010 | Huang et al. | 713/100 |
| 2010/0332661 A1* | 12/2010 | Tameshige | 709/226 |
| 2010/0332890 A1* | 12/2010 | Chen et al. | 714/2 |
| 2011/0029652 A1* | 2/2011 | Chhuor et al. | 709/223 |
| 2011/0035474 A1* | 2/2011 | Elzur et al. | 709/221 |
| 2011/0106883 A1* | 5/2011 | Gupta et al. | 709/203 |
| 2011/0161592 A1* | 6/2011 | Nachimuthu et al. | 711/125 |
| 2011/0173326 A1* | 7/2011 | Lambert et al. | 709/226 |
| 2011/0231571 A1* | 9/2011 | Joshi et al. | 709/236 |
| 2012/0084552 A1* | 4/2012 | Sakthikumar et al. | 713/100 |
| 2013/0117766 A1* | 5/2013 | Bax et al. | 719/323 |

FOREIGN PATENT DOCUMENTS

| | | |
|---|---|---|
| JP | 2000-267934 | 9/2000 |
| JP | 2001-075810 | 3/2001 |
| JP | 2006-127324 | 5/2006 |

OTHER PUBLICATIONS

"Intelligent Platform Management Interface," From Wikipeida, published Feb. 2, 2009.*

"Out-of-band management," from Wikipedia, published Apr. 14, 2009.*

Chinese Office Action cited in Appl. No. 2013-533829; mailed Mar. 6, 2014; 6 pages.

International Searching Authority, International Search Report and the Written Opinion, Jun. 30, 2011, 11 pages.

* cited by examiner

DEVICE HARDWARE AGENT

CROSS-REFERENCE TO RELATED APPLICATION

This application is a national stage application under 35 U.S.C. §371 of PCT/US2010/52976, filed Oct. 16, 2010.

FIELD OF THE INVENTION

The present invention relates to a device hardware agent that connects to one or more electronic components in a networked computer.

BACKGROUND

Software agents are often loaded into servers to gather information about electronic components operating in the server. This information is transmitted to another electronic device, such as an external management server, so a user can manage and diagnose the server. A separate software agent is often required for each of the server components that are managed.

Software agents can provide information and some control over device operation, but often require a Network Interface Card (NIC) on the server to be dedicated to communicate this information to the external management server. In order to communicate with the external management server, the software agents consume memory and processing resources on the managed server and can create software issues with the operating system (OS).

DETAILED DESCRIPTION

Figure 1:
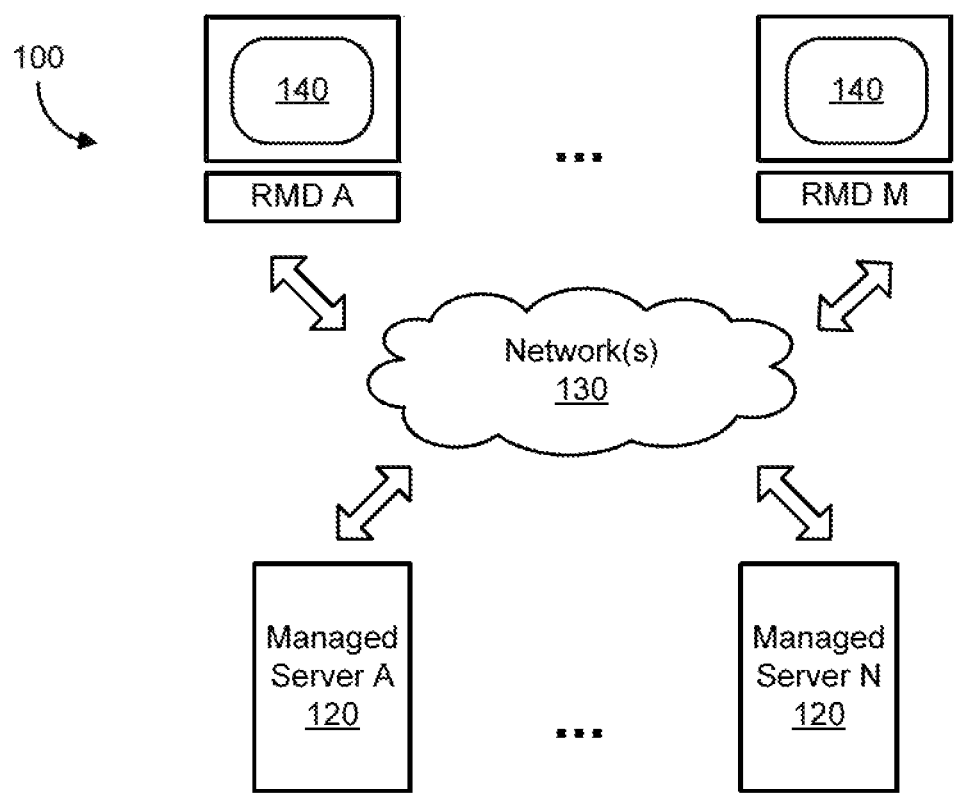
FIG. 1 shows a networked computer system including plural managed servers with device hardware agents and plural remote management consoles in accordance with an example implementation.

Example embodiments relate to apparatus and methods that utilize one or more device hardware agents to manage and control components in a computer or server.

In one example embodiment, the device hardware agent is a microcontroller that connects to an electronic device and performs various functions, such as monitoring for inventory, health status, and statistics. One or more microcontrollers monitor one or more components in the electronic device. By way of example, such components include, but are not limited to, Network Interface Cards (NICs), Host Bus Adapters (HBAs), storage controllers, and Central Processing Units (CPUs).

The device hardware agents collect information and transmit this information to a baseboard management controller that provides an interface for a user to review the collected information. For example, the information is provided on a Graphical User Interface (GUI), Command Line Interface (CLI), or Application Program Interface (API).

Each device hardware agent has two interfaces. One interface communicates information with an out-of-band (OOB) management processor, such as a Baseboard Management Controller (BMC). Another interface communicates (i.e., sends and receives) information with the device being monitored and/or controlled (e.g., communicates information with the NIC, HBA, CPU, etc.).

Communication can occur with various types of communication paths, such as serial, Inter-Integrated Circuit (i2C), and Ethernet. Further, the information being communicated is accessible in a standardized API that is independent of the device being managed. A connection between the microcontroller and the electronic device being monitored is based on the device itself, such as Joint Test Action Group (JTAG).

The device management interface allows management and control of the device without impacting the OS interface. A interface can be used since it is already embedded in devices like NICs and RAID controllers. Example interfaces include, but are not limited to, JTAG interfaces, i2C, serial, Ethernet, GPIO, and SPI. A component can use one or more of these example interfaces.

In order for the device hardware agent to be customized to understand how to access device specific information, the device specific parameters are programmed into the device hardware agent in the device specific firmware with details on device specific access (JTAG mode, address register, format of the data, user visible name of the information, read or read/write ability, etc.). In addition the device agent can include one or more of each type of a device management interface to allow a single device agent to manage multiple identical devices such as multiple NICs.

Device hardware agent firmware is divided into two sections, one section for common API firmware and the other section for device specific firmware. This division allows the computer manufacturer to design the common API firmware to match their baseboard management controller (BMC), and allows the device manufacturer to design the device specific firmware to interface to their specific device using the device management interfaces and to communicate with the common API firmware provided by the computer manufacturer. A device hardware agent debug interface can be used during device hardware agent firmware development, but this debug interface might not be connected in production. Communication between the common API firmware and device specific firmware can be accomplished using the device hardware agent memory, but could also use the common API interface.

The device hardware agent provides a common API on the BMC interface so the BMC does not have to code device specific data but provides information and control of the device as indicated in the common API.

The device hardware agent communicates information (e.g., inventory, health status, and statistics) to the baseboard management controller and also receives commands to control and/or manage the electronic device to which the device hardware agent is connected. For example, the device hardware agent receives commands to change a behavior of electronic device, such as receiving a command to change a Media Access Control (MAC) address of a port on a NIC. Other commands to the device hardware agent enable firmware on the electronic device to be updated, or to enable or disable a port.

During manufacturing, the device hardware agent is programmed to connect and communicate with a specific electronic component in an electronic device (e.g., programmed to communicate with an HBA, HIC, CPU, etc.). In this manner, two device hardware agents with similar or same hardware components can be used to manage different electronic components. For example, one device hardware agent is programmed to interface with the storage controller in a server, and another device hardware agent is programmed to interface with a NIC in the server. Having the device hardware agent be data-driven on both interfaces allows firmware in the device hardware agent to be flexible enough to support different devices with a customized firmware image for each device.

In one embodiment, a single device hardware agent manages a single electronic component. In another embodiment, a single device hardware agent manages plural identical electronic components.

In another embodiment, multiple device hardware agents could be embedded in a single device such as the baseboard management controller to manage multiple different electronic components in a server or computer.

In another embodiment, the device hardware agent could be embedded in the component device, providing a BMC interface for direct connection to the BMC without requiring a separate device hardware agent ASIC.

The device hardware agent provides information and control for devices without dependency on installing OS agents. Because the device management is accomplished through a common API, both the BMC and external management server can provide device management with common management code without having to write or execute device specific management code.

Hardware agents in accordance with example embodiments thus replace OS software agent functionality (i.e., monitoring of the device, control of the device, and collection operation statistics of the device) without any CPU or PCIe bus utilization. This removes the need to develop and maintain OS agent code across all supported operating systems and allows management monitoring of different devices in the server across various operating systems. For example, a device hardware agent for the CPU can replace Basic Input/Output System (BIOS) System Management Interface (SMI) code that performs power management, memory error monitoring and other SMI functions to eliminate any server performance impact for CPU monitoring and control.

Furthermore, the management of the devices can be accomplished through the BMC using out-of-band communication to completely isolate management communications from the computer OS.

FIG. 1 is a networked computer system 100 that includes plural managed computers 120 (shown as computer A to computer N) in communication with one or more remote management devices or consoles 140 (shown as RMD A to RMD M). The managed computers 120 include special circuitry and software for capturing, analyzing, compressing and transmitting information to the remote management devices 140 independent of an operating system (OS). This circuitry and software operate without regard to the existence or type of OS present on the managed server. Therefore, the remote management devices 140 can access, interact, and monitor the managed servers 120 from a remote console.

One exemplary embodiment uses an embedded server management technology, such as iLO (Integrated Lights-Out). A remote server management device facilitates remote access and administration of server computer systems. Remote console functionality allows a user to access a server from another computer, known as a management console or a remote management device (RMD). The management console enables a user to interact with the server as though the user were physically at the server and interacting with the server with, for example, a display attached to the server.

The network(s) 130 can be any sort of network capable of transmitting data between two devices. Without limitation, some examples of networks include a local area network (LAN), a wide area network (WAN), a hardwired point-to-point connection, a point-to-point connection over a telecommunications line, a wireless connection, and an internet connection.

The managed servers 120 are not limited to any particular type of server and include, but are not limited to, application servers, web servers, database servers, etc. In one exemplary embodiment, the managed servers are blade computers, such as blade servers operating in a rack, enclosure, or data center.

Embodiments in accordance with the present invention are not limited to any particular type of networked computer systems. The managed servers and/or remote management devices include various portable and non-portable computers and/or electronic devices including, but are not limited to, compute (portable and non-portable), servers, main frame computers, distributed computing devices, laptops, and other electronic devices and systems whether such devices and systems are portable or non-portable.

Figure 2:
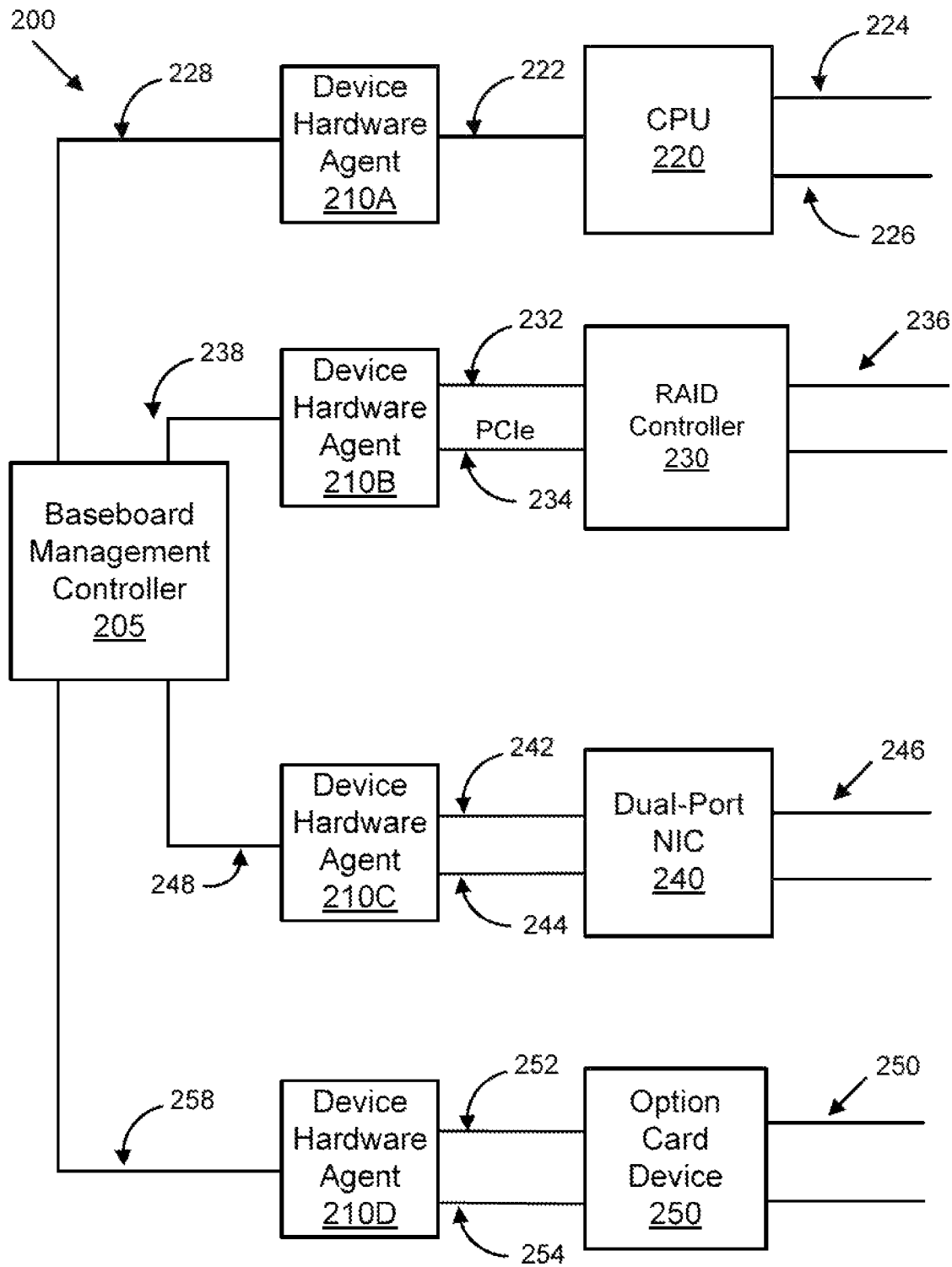
FIG. 2 shows a block diagram of a managed server with plural device hardware agents in accordance with an example implementation.

FIG. 2 shows a block diagram of a managed server 200 that includes a baseboard management controller 205 (such as a server iLO manager) connected to plural device hardware agents 210A, 210B, 210C, and 210D. Each device hardware agent includes a common API and connects to a different electrical component in the server. Example embodiments standardize the interface between the iLO manager and the device hardware agents with both a standard electrical and API definition. Standardizing the API and the electrical interface reduces both hardware and iLO firmware designs used to support the servers.

Device hardware agent 210A connects to a CPU 220 via a CPU interface 222. The CPU 220 includes a memory interface 224 and a Peripheral Component Interconnect Express (PCI-E or PCIe) connection 226. A device manager interface 228 connects the baseboard management controller or server iLO manager 205 to the device hardware agent 210A.

Device hardware agent 210B connects to a RAID controller 230 via a RAID interface 232 and a PCIe connection 234. The RAID controller 230 includes plural device ports 236. A device manager interface 238 connects the baseboard management controller or server iLO manager 205 to the device hardware agent 210B.

Device hardware agent 210C connects to a dual port NIC 240 via a NIC interface 242 and a PCIe connection 244. The dual port NIC 240 includes plural device ports 246. A device manager interface 248 connects the baseboard management controller or server iLO manager 205 to the device hardware agent 210C.

Device hardware agent 210D connects to an option card device 250 (e.g., an HBA) via a HBA 252 and a PCIe connection 254. The option card device 250 includes plural device ports 256. A device manager interface 258 connects the baseboard management controller or server iLO manager 205 to the device hardware agent 210D.

Electronic components being managed in the server generally do not include a common debug interface. The device hardware agent, however, includes one or more interfaces such as i2C, serial, JTAG, GHQ, and SPI allowing the vendor specific firmware in the device hardware agent to access internal registers and control the electronic component.

The device manager interfaces 228, 238, 248, and 258 are a standard or common hardware interface. For example, this interface can be one already included in an iLO design, and can be one that is available on Peripheral Component Interconnect (PCI) option cards and mezzanine cards.

Figure 3:
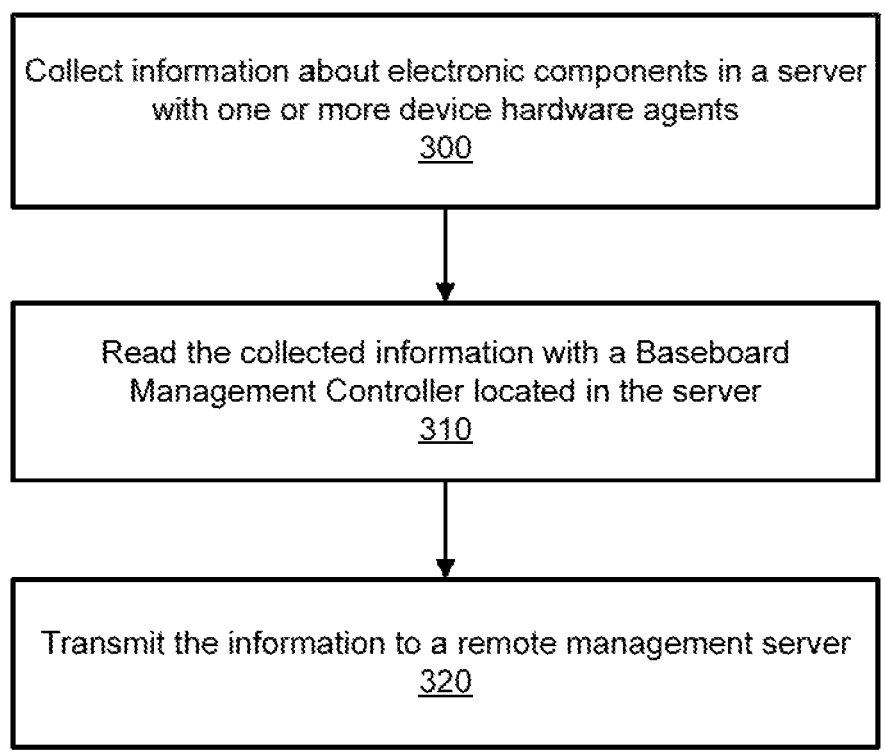
FIG. 3 is a flow diagram for managing a server with one or more device hardware agents in accordance with an example implementation.

FIG. 3 is a flow diagram for managing a server with one or more device hardware agents in accordance with an example implementation.

According to block 300, one or more device hardware agents located in the server collects information about one or more electronic components. For example, device hardware agents collect information about the operation of a CPU, a RAID controller, a HBA, a NIC, and a server blade mezzanine card.

According to block 310, the information collected by the device hardware agents is read by or transmitted to a baseboard management controller (BMC) located in the server. Each device hardware agent includes one or more different interfaces to enable the device hardware agent to communicate with different electronic components and the BMC.

In one embodiment, each device hardware agent is connected to and collects information about one electronic component. In another embodiment, a single device hardware agent is connected to and collects information about a plurality of different electronic components (e.g., a NIC, HBA, CPU controller, etc.).

According to block 320, the collected information is transmitted to a remote management server. For example, a user at a remote management device logs into server via the server iLO manager and retrieves the collected information. The user can also transmit data and commands to the BMC or server iLO manager and electronic components through the device hardware agents.

Figure 4:
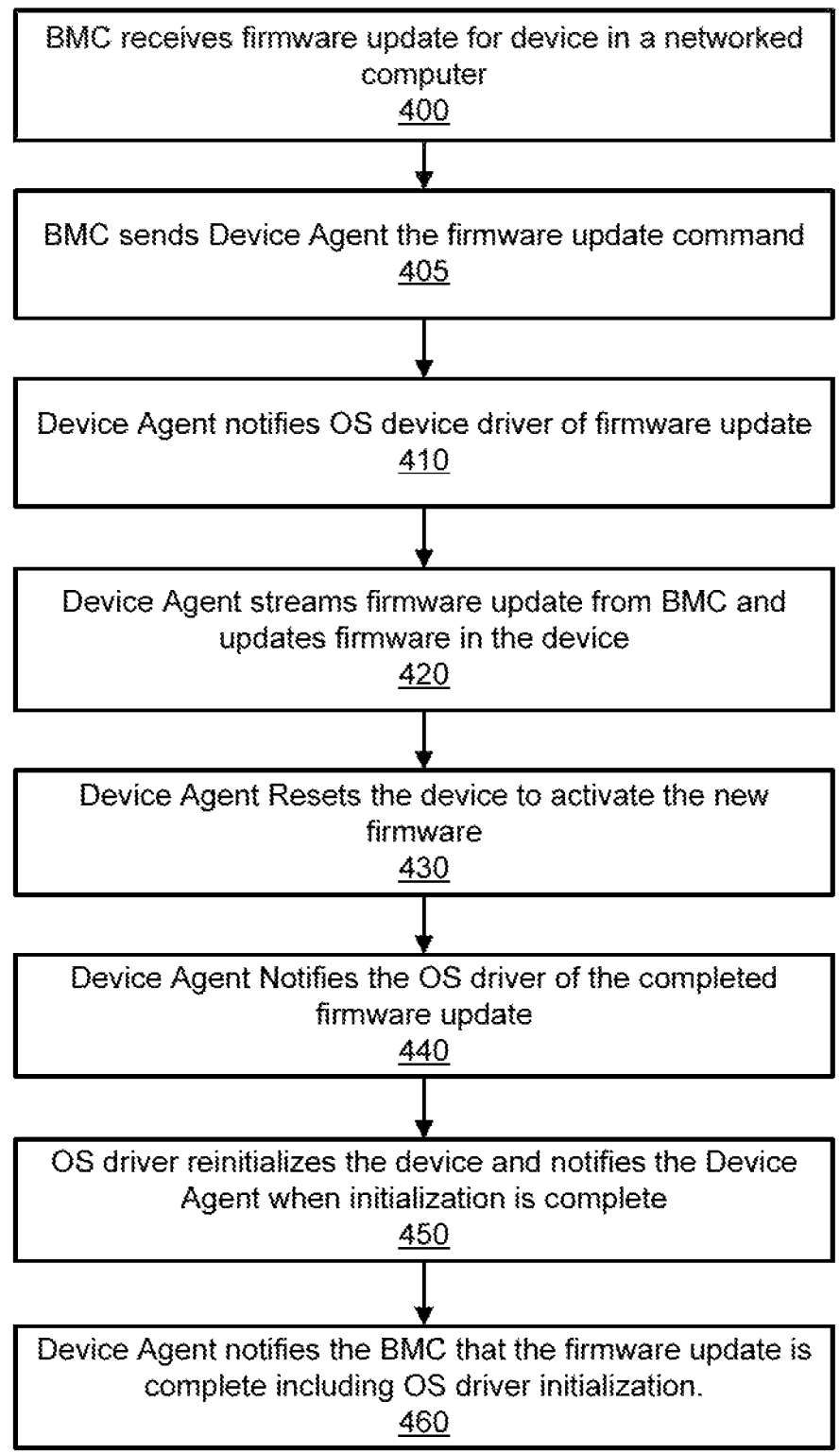
FIG. 4 is a flow diagram of providing a firmware update via a device hardware agent to an electronic component in a server without rebooting the server in accordance with an example implementation.

FIG. 4 is a flow diagram of providing a firmware update via a device hardware agent to a device (i.e., an electronic component) in a server without rebooting the server.

According to block 400, a baseboard management controller receives a new firmware update for a device in a networked computer.

According to block 405, the BMC sends the device hardware agent the firmware update command for that device.

According to block 410, firmware in the device hardware agent notifies an OS device driver that a firmware update will occur. This notification causes the device driver to stop further OS data transfer requests to the device.

According to block 420, the firmware in the device hardware agent streams the firmware update from the BMC and updates the device firmware.

According to block 430, after the firmware update is completed, the device hardware agent activates the new firmware by a hardware reset of the device. This device hardware reset occurs without rebooting the server.

According to block 440, after the device initializes from the reboot, the device hardware agent sends a message through the device to the OS device driver to notify the driver of the completed firmware update. For example, an OS specific message is sent indicating that a "hot-plug" PCI event was received for the device and the device was initialized. This initialization does not require an OS reboot.

According to block 450, the OS driver reinitializes the device and notifies the device hardware agent when initialization is complete.

According to block 460, the device hardware agent notifies the BMC that the firmware update is complete including OS driver re-initialization.

This method of FIG. 4 can also be extended to device driver updates using the device hardware agent and device (e.g. with the OS device driver being uploaded from the iLO manager through the device hardware agent to the current OS device driver). The new device driver would reload (e.g., using the same "hot-plug" PCI event message and reinitialize the device).

Figure 5:
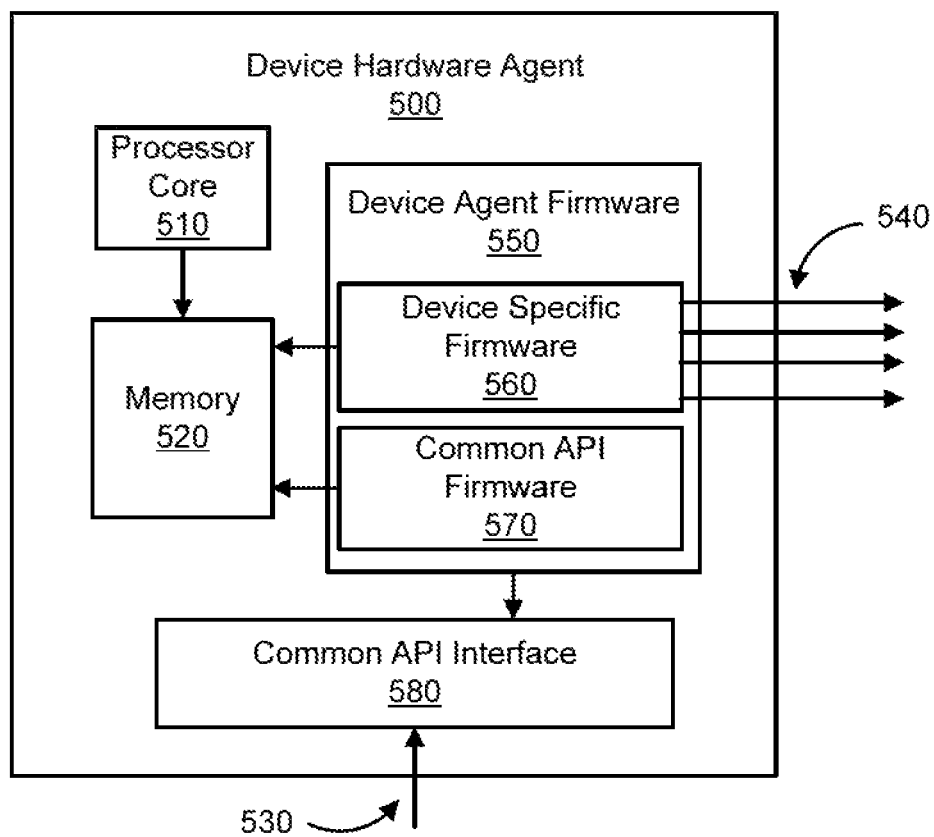
FIG. 5 is a device hardware agent in accordance with an example embodiment.

FIG. 5 is a device hardware agent 500 according to an example embodiment. In one embodiment, the device hardware agent 500 is a microcontroller that includes a processor core 510 coupled to a memory 520. A first interface 530 is provided to communicate with a computing device (e.g., an iLO manager), and one or more second interfaces 540 are provided to communicate with electrical components in a computing device. The first interface 530 is a BMC interface, such as i2C, serial Ethernet, GPIO, JTAG, SPI, etc. The second interface 540 is a device management interface, such as i2C, serial Ethernet, GPIO, JTAG, SPI, etc. The processor core 510 and memory 520 couple to device agent firmware 550 that includes device specific firmware 560 and common API firmware 570.

The device agent firmware 550 couples to a common API interface 580, such as registers, mailboxes, etc.

As used herein and in the claims, the following terms are defined as follows:

The term "common API" or "standardized API" is the application programming interface that abstracts the various different devices into a common set of hardware device manager interface commands (example: show device-name, show firmware-version or update firmware).

The term "hardware" is a physical component of an electronic device (e.g., a component of a server). Hardware is tangible (i.e., can be touched), as opposed to software which is not tangible.

The terms "Integrated Lights Out" (iLO) or baseboard management controller (BMC) are server management technologies that enables a remote electronic device or computer to perform activities on a server from a location remote to the server. For example, an iLO card has a separate network connection and its own IP (Internet Protocol) address to which a user can connect through HTTP (Hyper Text Markup Language) over the Internet. The remote electronic device can perform actions such as reset the server, power-up the server, take over the screen of the server, mount remove physical CD/DVD drives or images, access the server's IML (Integrated Management Log), and provide a remote console for the server. Further, iLO and BMC can be used as an out-of-band management technology.

The term "microcontroller" is a single integrated circuit that includes a processor core and memory. The microcontroller can also include programmable input/output (I/O) peripherals.

The term "out-of-band communication" is the exchange of information (e.g. control information) that is separate from server OS data. The out-of-band information can be provided on a separate, dedicated channel from the data.

The term "out-of-band management" is system console access even in the event of a primary network subsystem hardware or software failure. This access can be provided with a console server or a remote access card.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A server, comprising:
   an electronic component;
   a baseboard management controller (BMC); and
   a device hardware agent that includes a first interface connected to the electronic component and a second interface connected to the BMC, wherein the device hardware agent includes a processor core and memory that monitor operation of the electronic component and provide updates to the electronic component without utilizing a software agent,
   the device hardware agent to collect information about the operation of the electronic component, and to transmit, to the BMC, the collected information.

2. The server of claim 1, wherein the electronic component is one of a Network Interface Card (NIC), a Host Bus Adapter (HBA), a controller, and a Central Processing Unit (CPU).

3. The server of claim 1, wherein the collected information comprises information regarding inventory, health status, and statistics of the electronic component.

4. The server of claim 3, wherein the BMC is to send the collected information received from the device hardware agent to a remote management server over a network.

5. The server of claim 1, wherein the second interface provides an out-of-band communication path between the BMC and the device hardware agent.

6. The server of claim 1, wherein the first interface is a Joint Test Action Group (JTAG) interface.

7. The server of claim 1, wherein the BMC is to receive a firmware update, and to send the firmware update to the device hardware agent, and the device hardware agent is to provide the firmware update to the electronic component.

8. A computer, comprising:
   first and second electronic components;
   a baseboard management controller (BMC) to communicate with the first and second components;
   a first device hardware agent comprising a processor core and connected between the BMC and the first electronic component to collect information, without using a software agent, about operation of the first electronic component and transmit the collected information about the operation of the first electronic component to the BMC; and
   a second device hardware agent comprising a processor core and connected between the BMC and the second electronic component to collect information, without using a software agent, about operation of the second electronic component and transmit the collected this-information about the operation of the second electronic component to the BMC.

9. The computer of claim 8, wherein the first and second electronic components are different and are selected from among a Network Interface Card (NIC), a Host Bus Adapter (HBA), a controller, and a Central Processing Unit (CPU).

10. The computer of claim 8, wherein the first and second device hardware agents are to both communicate with the BMC using a standardized Application Program Interface (API).

11. The computer of claim 8, wherein:
    the first device hardware agent is customized to access device specific information of the first electronic component to collect the information about the operation of the first electronic component, and
    the second device hardware agent is customized to access device specific information of the second electronic component to collect the information about the operation of the second electronic component.

12. The computer of claim 8, wherein the first device hardware agent further comprises a first interface connected to the BMC, and a second interface connected to the first electronic component.

13. The computer of claim 12, wherein the second device hardware agent further comprises a first interface connected to the BMC, and a second interface connected to the second electronic component, and wherein the first interface of the first device hardware agent and the first interface of the second device hardware agent are standardized according to a common interface definition.

14. A method comprising:
    collecting, by a device hardware agent in a server, information about an electronic component operating in the server, the device hardware agent connected between a baseboard management controller (BMC) and the electronic component, and the device hardware agent comprising a processor core, wherein the device hardware agent performs the collecting without using a software agent;
    transmitting, by the device hardware agent, the information to the BMC located in the server; and
    providing, by the device hardware agent, a firmware update to the electronic component.

15. The method of claim 14 further comprising, collecting, by the device hardware agent, information about plural different electronic components operating in the server, wherein the plural different electronic components include a Network Interface Card (NIC) and a Host Bus Adapter (HBA).

16. The method of claim 14 further comprising, resetting the electronic component to activate the firmware without rebooting the server.

17. The method of claim 14, wherein the hardware device agent further comprises a first interface connected to the BMC, and a second interface connected to the electronic component.

18. The method of claim 17, wherein the hardware device agent is a first hardware device agent, the method further comprising:
    collecting, by a second hardware device agent in the server without using a software agent, information about a second electronic component operating in the server, the second hardware device agent connected between the BMC and the second electronic component, and the second hardware device agent comprising a processor core, a first interface to the BMC, and a second interface to the second electronic component.

19. The method of claim 18, wherein the first interface of the first device hardware agent and the first interface of the second device hardware agent are standardized according to a common interface definition.

* * * * *

UNITED STATES PATENT AND TRADEMARK OFFICE
CERTIFICATE OF CORRECTION

PATENT NO. : 9,208,047 B2  
APPLICATION NO. : 13/817932  
DATED : December 8, 2015  
INVENTOR(S) : Montgomery C McGraw Page 1 of 1

It is certified that error appears in the above-identified patent and that said Letters Patent is hereby corrected as shown below:

In The Claims

In column 8, line 40, in Claim 8, delete "collected this-" and insert -- collected --, therefor.

Signed and Sealed this
Twenty-fourth Day of May, 2016

Michelle K. Lee
*Director of the United States Patent and Trademark Office*